United States Patent [19]

Pechacek

[11] 4,398,646
[45] Aug. 16, 1983

[54] MULTI-LAYERED VESSEL WITH DISCONTINUITY NEUTRALIZING AREA

[75] Inventor: Raymond E. Pechacek, Houston, Tex.

[73] Assignee: Hahn & Clay, Houston, Tex.

[21] Appl. No.: 321,477

[22] Filed: Nov. 16, 1981

[51] Int. Cl.³ .................... F17C 1/14; B23K 31/00
[52] U.S. Cl. ................................... 220/3; 220/453; 220/5 A; 228/165; 228/184
[58] Field of Search .......... 220/3, 453, 468, DIG. 29, 220/5 R, 5 A, 83; 29/447; 228/165, 184

[56] References Cited

U.S. PATENT DOCUMENTS

| | | | |
|---|---|---|---|
| 726,026 | 4/1903 | Canda | 228/165 |
| 1,467,792 | 9/1923 | Holmes | 228/165 X |
| 3,604,587 | 9/1971 | Pechacek | 220/3 |
| 3,774,296 | 11/1973 | Clay | 29/471.3 |
| 3,785,040 | 1/1974 | Pechacek | 29/447 |

OTHER PUBLICATIONS

Section VIII, Rules for Construction of Pressure Vessels, ANSI/ASME BPV-VIII, Figs. AD-1117.5 and ULW-17.5, Jul. 1, 1980.

Primary Examiner—William Price
Assistant Examiner—Gary E. Elkins
Attorney, Agent, or Firm—Pravel, Gambrell, Hewitt, Kirk & Kimball

[57] ABSTRACT

A multi-layered vessel which includes a multi-layered generally cylindrical shell and at least one multi-layered generally hemispherical head of less thickness than the shell. The head has a main section and discontinuity neutralizing portion adjacent the shell. Each layer of the head main section and the discontinuity neutralizing portion have gores with substantially equal radius of curvature. The discontinuity neutralizing portion gores have a different center of curvature than the gores of the head main section.

8 Claims, 3 Drawing Figures

MULTI-LAYERED VESSEL WITH DISCONTINUITY NEUTRALIZING AREA

TECHNICAL FIELD OF THE INVENTION

This invention relates to multi-layered pressure vessels.

DESCRIPTION OF THE PRIOR ART

Vessels made to contain fluid and/or gases under high pressures are often constructed of a plurality of layers, such vessels often being referred to as multi-layered vessels. In such vessels, each layer is formed from individual plates welded onto an inner layer. In one multi-layered vessel design, such as that shown in U.S. Pat. No. 3,785,040, there is a generally cylindrical shell which is closed at each end by a generally hemispherical head. Each layer of the generally cylindrical shell is made from generally rectangular plates curved along one axis, with the center for the curvature being the longitudinal axis of the shell. Each layer of the hemispherical head is composed of gores with a common center of curvature. The center of curvature for each layer of the hemispherical head is on the shell axis at one end of the shell. Thus, for each layer of such head (first, second, third, etc.), the center of curvature of each layer is the same.

Because the inherent strength of a hemispherical body is greater than that of a cylindrical body, the thickness of the multi-layered hemispherical head may generally be less than the thickness of the cylindrical body. Because the thinner head has the same strength as the thicker shell, it is not necessary to make the head of the same thickness, and due to the cost of manufacture, it is certainly desirable to construct the vessel with as few layers as possible.

In vessels with thinner heads, the change in wall thickness from shell to head creates an area of transition and structural weakness where shell and head are joined.

In some known multi-layered vessels, the curvature of the inner layer of the head is tangential to the inner layer of the shell where they meet. The center of curvature of the head is on the axis of curvature of the cylindrical shell at the end of the shell. Therefore, if the shell has an inner radius of R and a thickness of $T_s$, the head will also have an inner radius of curvature of R and a thickness of $T_h$ which is typically equal to approximately one-half of $T_s$. Taking a sectional view through such a vessel, the centerline of any part of the vessel is defined as the line which is equal distance from the outer surface of that part and the inner surface of that part. The centerline $CL_s$ of the shell will have a radius of $R + \frac{1}{2}T_s$ and the centerline of the head $CL_h$ will have a radius of $R + \frac{1}{2}T_h$. The difference in radius is therefore $\frac{1}{2}(T_s - T_h)$.

A discontinuity stress is caused by the moment couple where head and shell meet. The discontinuity stress is increased or decreased depending on the relationship of the radius of curvature of the head and the radius of the shell. It is generally desirable that the radius of curvature of the head centerline be substantially equal to the radius of the centerline of the shell, although in some applications the radius of curvature of the head centerline may be relatively smaller to effectively neutralize the discontinuity stress. However, simply increasing the radius of curvature of the centerline of the head $CL_h$ to the desired length to neutralize the discontinuity would weaken the vessel because the inner layers of shell and head would then not meet tangentially. Instead, the head innermost layer would join perpendicularly to the middle of the shell end. This jump along the inner surface of the vessel is generally unacceptable.

Removing the discontinuity by making the head as thick as the shell is a possible but undesirable solution because of the extra cost and weight.

Another technique to reduce the discontinuity is to increase the head radius to the desired length and extend the shell layers longitudinally until they meet the head layers. This removes the sharp jump along the inner surface of the vessel but causes other problems. Because each shell layer will not be tangential to the adjacent head layer, a single through weld must be used to join shell to head. A through weld may be undesirable, particularly in field construction. In addition, the inner shell layer will meet the inner head layer at an angle which is undesirable.

No pressure vessel design is known in which the radius of curvature of the head may be set to neutralize the discontinuity stress and the gores of the head tangentially meet the shell plates.

SUMMARY OF THE INVENTION

In the present invention, a multi-layered vessel includes a multi-layered generally cylindrical shell and at least one multi-layered generally hemispherical head of less thickness than the shell. The head has a main section and a discontinuity neutralizing portion adjacent the shell. Each layer of the head main section and the discontinuity neutralizing portion have gores with substantially equal radius of curvature. The discontinuity neutralizing portion gores have a different center of curvature than the gores of the head main section. Thereby, the radius of curvature may be set so that the discontinuity stress is substantially eliminated and radial shear is minimized.

DESCRIPTION OF THE PREFERRED EMBODIMENT

Figure 1:
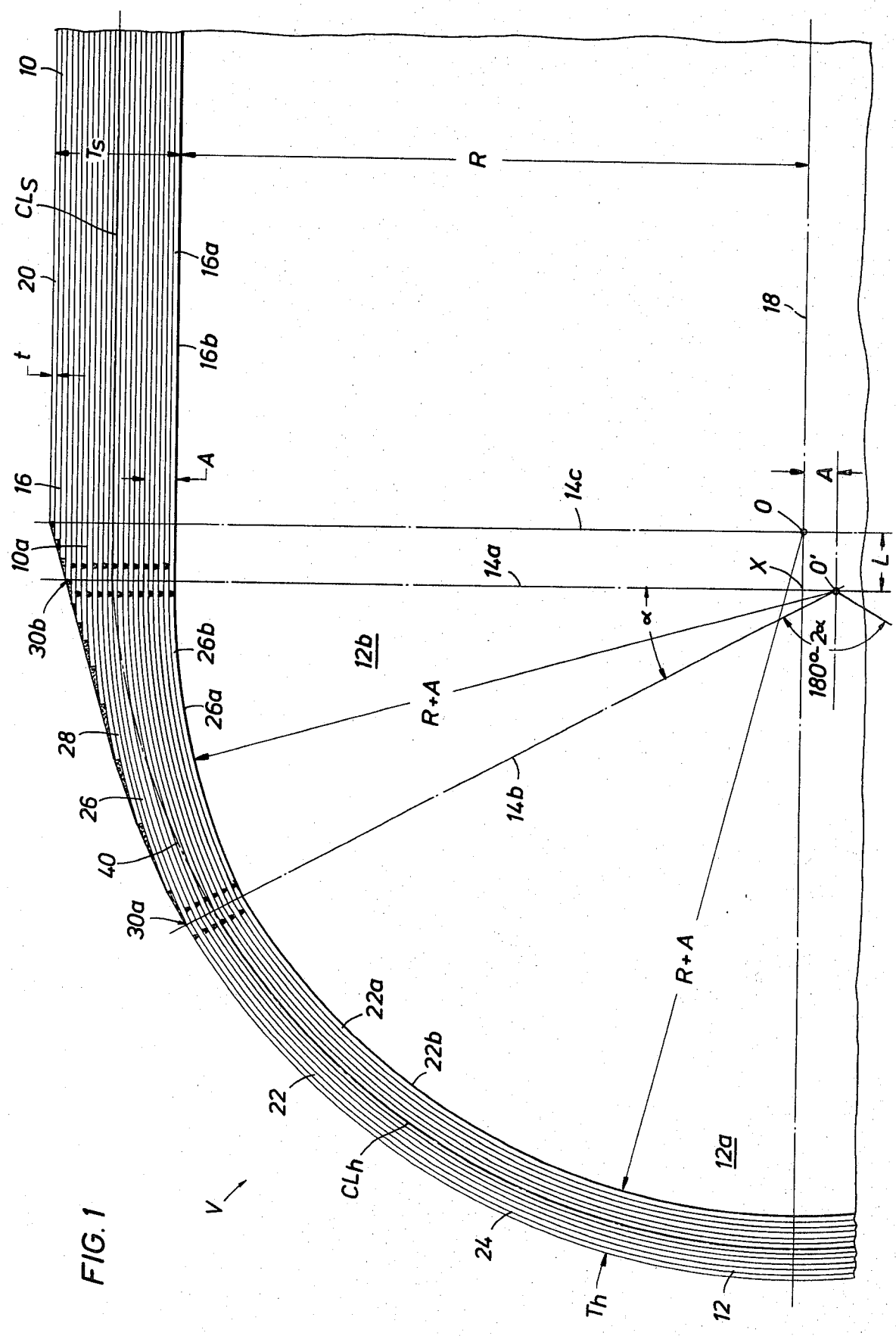
FIG. 1 is a cross-section of a portion of the multi-layered vessel of the present invention showing a discontinuity neutralizing portion.

Referring to the drawings, the vessel V of the present invention includes a generally cylindrical multi-layered shell 10 and a generally hemispherical multi-layered head 12 which is joined to an end 10a of the shell 10. Shell 10 is thicker than head 12. The head 12 has a transition or discontinuity neutralizing portion 12b adjacent shell end 10a. In the preferred embodiment, the radius of the shell centerline $CL_s$ substantially equals the radius of curvature of the head centerline $CL_h$ so that the shell centerline $CL_s$ and the projection 40 of the head centerline $CL_h$ meet where the shell 10 and head 12 join together.

The cylindrical shell 10 is formed of multiple layers 16 with each shell layer being welded onto the next inner layer. Each layer 16 has a thickness of t and is formed from generally rectangular plates 20 of thickness t. All the plates of each layer have the same radius of curvature. The welding of the plates 20 to each other is not shown since it is presently known in the art. The center of curvature of each plate 20, in each layer of the shell 10, is along the longitudinal axis 18. The radius of curvature of each layer of the shell plates 20 increases from layer to adjacent outer layer, but each radius of curvature is generated along the common center of curvature along axis 18. The inside layer 16a has a cylindrical inside surface 16b with a radius of curvature R. The thickness $T_s$ of the shell wall is equal to the thickness t of each individual layer 16 times the number of layers. Therefore, the radius of the shell centerline $CL_s$ is equal to $R + \frac{1}{2}T_s$.

The hemispherical vessel head 12 is composed of layers 22 each also with a thickness of t. The head 12 has a wall thickness of $T_h$. In general, $T_h$ will be approximately one-half of $T_s$. Each individual head layer 22 is formed from gores 24. For the purposes of explanation, the hemispherical head 12 is divided into two sections, a main section 12a and the transition section 12b. The transition section 12b is defined as the circumferential section generated by the angle α, which is formed in section by line 14a and 14b, rotated 360° about point O'. Centerpoint O is at the intersection of the longitudinal axis 18 of the shell 10 and line 14c, which represent a plane adjacent the area of connection of the head to the shell. Point O' in FIG. 1 is one of a circle of points generated about point X (an extension of axis 18) having a radius A which will be more fully described hereinafter. The main section 12a is the remainder of the hemispherical head 12. Each gore 24 in main head section 12a has a curvature defined by a radius rotated about point O, which is on the longitudinal axis 18 of the shell 10 substantially adjacent the end 10a of shell 10 which is closed by head 12. The welding of the gores 24 to each other is not shown.

The radius of curvature of the inner surface 22b of the main head section 12a is equal to $R + A$, where A is $\frac{1}{2}(T_s - T_h)$ or one-half the difference in the thickness of the shell 10 and the head 12. The radius of curvature of the gores 24 increases by an amount t for each layer out from the innermost layer 22a of the head. Thereby, the radius of curvature of the centerline $CL_h$ of head 12 in main head section 12a is computed as follows:

$CL_h = R + A + \frac{1}{2}T_h$;

$A = \frac{1}{2}(T_s - T_h)$; so $CL_h = R + \frac{1}{2}(T_s - T_h) + \frac{1}{2}T_h = R + \frac{1}{2}T_s$ Thus, $CL_h$, the radius of curvature of the main head section 12a, is equal to the radius of curvature of the centerline $CL_s$ of the shell 10.

The actual centerline of the head 12 in transition section 12b will not be a smooth arc section because of the tapering of the outer layers of the transition section 12a. However, the head centerline $CL_h$ as extended through transition section 12b by extension curve 40 will meet the shell 10 centerline $CL_s$.

The discontinuity neutralizing portion or transition section 12b is adjacent the end 10a of shell 10 and represents the circular area generated by the angle α about center O'. The discontinuity neutralizing portion 12b is formed of multiple layers 26 of thickness t, with each layer formed from gores 28. The radius of curvature of each discontinuity neutralizing portion gore 28 is equal to the radius of curvature of the adjacent main section head gore 24 in the same layer. Thus, the inner surface 26a of the inner layer 26b of the discontinuity neutralizing portion 12b has a radius of curvature equal to $R + A$. However, the center O' of curvature of each gore 28 of discontinuity neutralizing portion 12b is offset from the center of curvature O of the main section 12a of the hemispherical head 12. The center of curvature O' is radially offset from the head center of curvature O by an amount equal to A or $\frac{1}{2}(T_s - T_h)$. The center of curvature O' is offset axially or longitudinally away from the shell 10 by an amount L which is calculated so that the discontinuity neutralizing portion gores 28 are tangential to the plates 16 of the shell 10 where they are joined and are also substantially tangential to the gores 24 of the main head section 12a where they meet. Therefore, the amount of longitudinal offset L of the center of curvature O' from center of curvature O is equal to:

$$(R + A) \cdot \sin \alpha - \sqrt{(R + A)^2 - ((R + A) \cdot \cos \alpha + A)^2} .$$

The angle α of the discontinuity neutralizing portion 12b in the preferred embodiment will equal 2·arc cos $(R/(R+A))$. The discontinuity neutralizing portion gores 28 are substantially tangential to the head gores 24 at the place 30a where they meet. The discontinuity neutralizing portion gores 28 are tangential to the shell plates 20 at the place 30b where they meet.

The radial offset A of center of curvature O' is always a positive amount. The locus of the centers of curvature O' of the discontinuity neutralizing portion gores 28 will be a circle with a radius equal to A and offset longitudinally from point O by an amount L.

Thereby, the head 12 will be formed entirely of gores (24 and 28) having the same radius of curvature throughout each layer; gores 28 will be substantially tangential to adjacent main section gores 24 or plates 20; and the head centerline $CL_h$ will have the same radius, $R + \frac{1}{2}T_s$, as the shell centerline $CL_s$. This will substantially neutralize the discontinuity and minimize axial shear.

In those embodiments in which it is desired that the head radius of curvature be somewhat less than the shell radius, the amount of radial displacement A is reduced by an amount equal to the desired difference in radii. The angle α and the longitudinal displacement are calculated as before from the shell inner radius R and A. Thereby, the head will be formed entirely of gores having the same radius of curvature throughout each layer; the discontinuity neutralizing portion gores will be substantially tangential to adjacent main section gores or shell plates and the head centerline radius will have the desired relation to the shell centerline radius. This will substantially neutralize the discontinuity and minimize axial shear.

Figure 2:
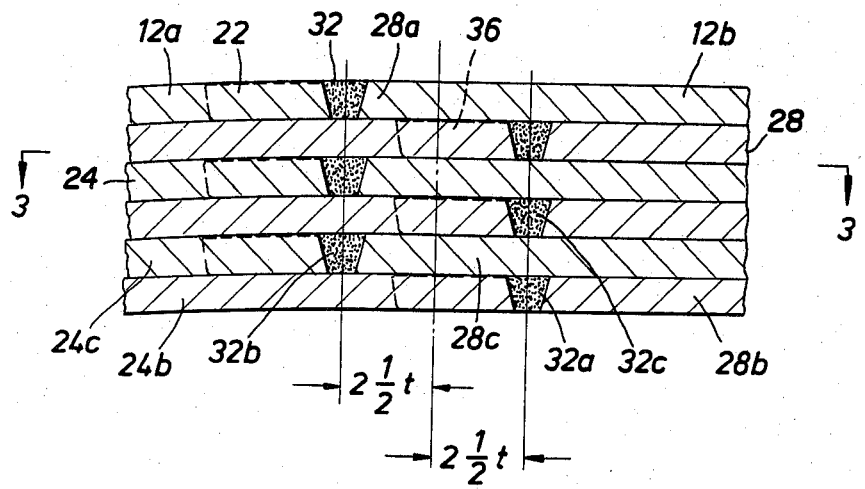
FIG. 2 is a detail of certain welds usable in the structure of FIG. 1.

In the preferred embodiment, the gores 28 of the discontinuity neutralizing portion 12b will be welded to the main head section 12a and shell 10 by having the gore ends 28a alternately overlapping the adjoining gores 24 (shown in FIG. 2) or plates 20 (not shown). If a discontinuity neutralizing portion gore 28b and main section head gore 24b are joined by a weld 32a, the discontinuity neutralizing portion gore 28c immediately above will extend past weld 32a by an amount substantially equal to $2\frac{1}{2}t$ where a weld 32b will join gore 28c to head gore 24c. Then the next layer will join at weld 32c substantially above weld 32a thereby forming the alternating overlap.

Figure 3:
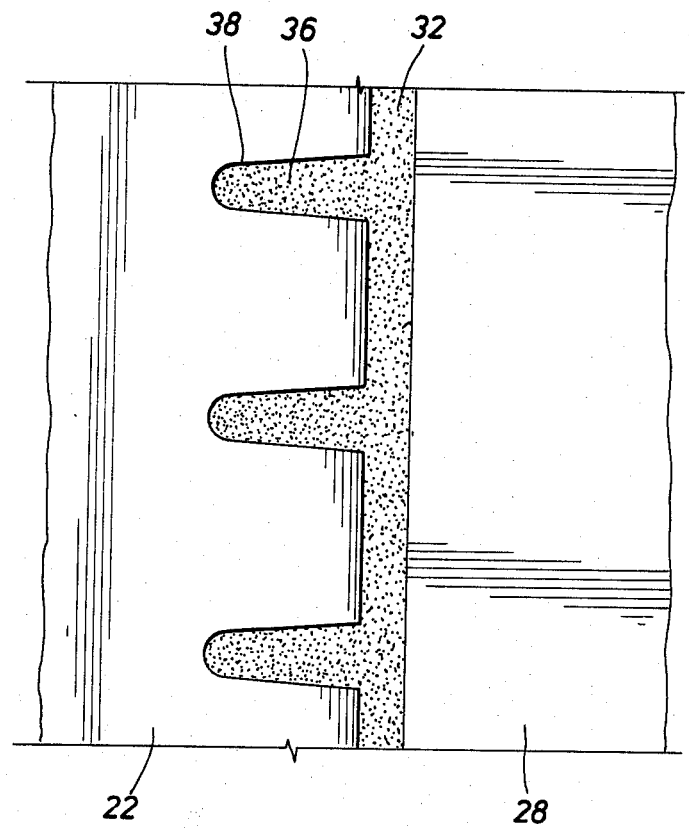
FIG. 3 is an enlarged cross-sectional view of a portion of the welds shown in FIG. 2 taken along line 3—3 of FIG. 2.

The circumferential welds 32 which join shell plates 20 to transition section gores 28 and transition section gores 28 to main head section 12a are strengthened by having multiple longitudinal portions 36, shown in FIG. 3, which extend into the adjacent gore portion 22 (or plate, not shown) and reduce planar shear. The adjoining gore portion 22 has corresponding longitudinal cutouts 38 to allow for weld portions 36. The weld longitudinal portions 36 may be reversed and extend into the gores 28 of the discontinuity neutralizing portion 12b instead.

The foregoing disclosure and description of the invention are illustrative and explanatory thereof and various changes in the size, shape and materials as well as the details of the illustrated construction may be made without departing from the spirit of the invention.

I claim:

1. A multi-layered vessel, comprising:
    a multi-layered generally cylindrical shell;
    at least one multi-layered generally hemispherical head mounted to an end of said shell;
    said shell being thicker than said head;
    said head having a main section and a discontinuity neutralizing portion adjacent said end of said shell;
    each layer of said head main section and said discontinuity neutralizing portion having gores with substantially equal radius of curvature in each layer; and
    said gores of said discontinuity neutralizing portion having a different center of curvature than the gores of said head main section.

2. The structure of claim 1, wherein:
    said center of curvature of each of said gores of said discontinuity neutralizing portion is offset radially from said center of curvature of said gores of said head main section; and
    said center of curvature of each of said gores of said discontinuity neutralizing portion is offset longitudinally outwardly of said shell.

3. The structure of claim 2, wherein:
    said centers of curvature of said gores of said discontinuity neutralizing portion are on a circle having a center on said longitudinal axis of said cylindrical shell, longitudinally outwardly of said shell.

4. The structure of claim 3, wherein said center of curvature of each of said gores of said discontinuity neutralizing portion is longitudinally offset from said center of curvature of said gores of said main section of said head by an amount equal to [the radius of curvature of the inner surface of said main section of said head times the sine of $\alpha$] minus the square root of [said radius of curvature of said inner surface of said main section of said head squared minus ((the radius of curvature of said inner surface of said main section of said head times the cosine of $\alpha$) plus the amount of radial offset of said center of curvature of said gores of said discontinuity neutralizing portion from said center of curvature of said gores of said head main section) squared] wherein $\alpha$ is equal to two times the arc cosine of [(said radius of curvature of said inner surface of said main section of said head minus said radial offset) divided by the radius of curvature of the inner surface of said main section of said head].

5. The structure of claim 4, wherein:
    said head main section has a centerline with a radius of curvature substantially equal to the radius of the centerline of said shell.

6. The structure of claim 5, wherein said radial offset is an amount substantially equal to one-half the difference of the thickness of said shell and said head.

7. The structure of claim 1, 2, 3, 4, 5 or 6, wherein the thickness of said head portion is approximately one-half the thickness of said shell.

8. The structure of claim 1, wherein;
    said discontinuity neutralizing portion gores are joined to said vessel by welds; and
    said welds along the circumferential edges of said discontinuity neutralizing portion gores have portions extending longitudinally.

* * * * *

UNITED STATES PATENT AND TRADEMARK OFFICE
CERTIFICATE OF CORRECTION

PATENT NO. : 4,398,646

DATED : August, 16, 1983

INVENTOR(S) : Raymond E. Pechacek

It is certified that error appears in the above-identified patent and that said Letters Patent are hereby corrected as shown below:

In line 54 of Column 1, please delete "$CL_n$" and insert therefor --$CL_h$--.

Signed and Sealed this

Eighth Day of November 1983

[SEAL]

Attest:

GERALD J. MOSSINGHOFF

Attesting Officer — Commissioner of Patents and Trademarks